United States Patent [19]

Jain

[11] 4,210,399

[45] Jul. 1, 1980

[54] SYSTEM FOR RELATIVE MOTION DETECTION BETWEEN WAVE TRANSMITTER-RECEIVER AND IRREGULAR REFLECTING SURFACE

[76] Inventor: Atul Jain, 1545 E. Mendocino Dr., Altadena, Calif. 91001

[21] Appl. No.: 879,046

[22] Filed: Feb. 21, 1978

Related U.S. Application Data

[63] Continuation-in-part of Ser. No. 758,637, Jan. 10, 1977, abandoned, which is a continuation of Ser. No. 601,791, Aug. 4, 1975, abandoned.

[51] Int. Cl.$^2$ .............................................. G01P 3/36
[52] U.S. Cl. ...................................... 356/28.5; 356/5; 367/89
[58] Field of Search ..................... 356/5, 28, 28.5, 111; 343/8, 9; 340/3 C, 15 S; 367/89

[56] References Cited

U.S. PATENT DOCUMENTS

| | | | |
|---|---|---|---|
| 3,432,237 | 3/1969 | Flower et al. | 356/28 |
| 3,472,593 | 10/1969 | Drinkwater | 356/28 |
| 3,838,424 | 9/1974 | Goldfischer | 343/8 |
| 3,952,583 | 4/1976 | Rosati | 356/111 |
| 4,068,207 | 1/1978 | Andermo et al. | 340/5 S |

OTHER PUBLICATIONS

Stavis, "Optical Diffraction Velocimeter", 2/66, pp. 99–102, Instruments and Control Systems, vol. 39.
Aggarwal et al., "Simultaneous Measurement . . . Photography", 6/77, pp. 420–423, Indian Journal of Pure and Applied Physics (New Delhi), vol. 15, #6.
Stavis, "A New Velocity Sensing Technique Using Laser Light", 10/64, pp. 1.3.5–1 to 1.3.5–7, East Coast Conference on Aerospace and Navigational Electronics, Balt., Md.

*Primary Examiner*—Nelson Moskowitz
*Attorney, Agent, or Firm*—Freilich, Hornbaker, Wasserman, Rosen & Fernandez

[57] ABSTRACT

Apparatus for detecting relative motion between a rough reflecting surface and a wave transmitting and receiving system in a plane parallel or perpendicular to the reflecting surface comprised of a transmitter (radar, laser, acoustic, and the like), a receiver having the same or different aperture as the transmitter, and means for detecting the finest interference fringes in the reflected wave pattern. Each fringe detected represents relative motion through a distance, S, that is a function of the maximum dimension, D, of the transmitting aperture. By counting fringes, total relative motion is determined, and by counting fringes for a unit of time, the rate of that motion is determined. For a small transmitting aperture, the distance, S, between fringes is directly related to kD in the parallel plane and to kD/tan $\theta$, in the normal plane, where $\theta$ is the angle between a reference axis normal to the reflecting surface and the axis of the receiving aperture, and k is a calibration constant equal to unity when the transmitting and receiving apertures are at the same distance, H, from the reflecting surface. For a large aperture, $S \simeq \lambda H/kD$ in the parallel plane and $S \simeq \lambda H/kD \tan \theta$ in the normal plane. In either plane, for the condition of $k \simeq 1$, the spacing $S \simeq \lambda H/D$ and $S \simeq \lambda H/D \tan \theta$ can be measured with a linear scan array so that with $\lambda$, D and $\theta$ known, the distance H can be determined.

8 Claims, 6 Drawing Figures

SYSTEM FOR RELATIVE MOTION DETECTION BETWEEN WAVE TRANSMITTER-RECEIVER AND IRREGULAR REFLECTING SURFACE

This application is a continuation in part of application Ser. No. 758,637 filed Jan. 10, 1977 which is a continuation of application Ser. No. 601,791 filed Aug. 4, 1975, both now abandoned.

BACKGROUND OF THE INVENTION

This invention relates to systems for detecting relative motion between a wave transmitter-receiver and a reflecting surface, and more particularly to detecting relative motion, either parallel or normal to the reflecting surface or both.

It is often desirable to detect relative motion between two objects. Coherent wave systems devised for that purpose have principally been of the doppler type where the frequency shift in the reflected signal received at the transmitter is used to determine the relative velocity between the transmitter-receiver (transceiver) and the reflecting surface. The velocity thus measured is along the radar beam axis. Consequently, if motion parallel to the reflecting surface is desired, it must be computed using a complex system. It is also not possible to measure the extent (distance) of the relative motion or position relative to the reflecting surface. Instead, it is necessary to compute it relative to a starting point as a product of velocity and time.

In any instances it is desirable to detect relative motion parallel to the reflecting surface, and to measure the extent of the motion and/or rate. For example, an aircraft pilot needs to know ground velocity in order to navigate by dead reckoning. Similarly, the captain of a ship needs to know his velocity through the water, and both the pilot and the captain need to know the total distance traveled at a given heading. That is customarily computed from velocity. If the velocity is relative to the water, accurate navigation requires that the velocity of the water relative to the earth also be detected.

There are many applications for relative motion detection besides navigation. For vehicular traffic control, as an example, it is sometimes desirable to know almost instantly the velocity of a vehicle passing a point on the side of the road. Many analogous applications in industrial process control will readily occur to those skilled in the art. The motion to be detected may not always be linear; it may, for example, be the turning of a wheel. In some cases the problem may be to detect any motion, and the extent and/or rate of motion between an object and a reflecting surface, where the object is to be stationary relative to the surface. In still other cases, what is of interest is position alone relative to a reflecting surface. Detected motion and/or position may be used in a servo system to control the motion or maintain the position of the object.

SUMMARY OF THE INVENTION

In accordance with the present invention, a receiver is employed with a coherent wave transmitter to receive waves reflected from a rough surface, either through the transmitting aperture, or a juxtaposed separate aperture. Connected to the receiver output is some suitable means for detecting the finest interference fringe modulations in the receiver output signal. Each modulation corresponds to an interference fringe crossed in a pattern of interference fringes fixed in space relative to the reflecting surface. The spacing, S, between fringes in a plane parallel to the reflecting surface is a function of the maximum dimension, D, of the transmitting aperture. If the aperture is sufficiently small for normal diffraction, i.e., if the width of the transmitted beam of waves is approximately equal to $\lambda H/D$, the distance, S, between fringes is directly related to kD in the parallel plane and to $kD/\tan \theta$ in a plane normal to the reflecting surface, where $\theta$ is the angle between an axis normal to the reflecting surface and the axis of the receiving aperture (normally also the axis of the transmitted beam) and k is a calibration constant equal to unity when the transmitting and receiving apertures are at the same distance, H, from the reflecting surface. For a large aperture, the fringe spacing $S_p$ in the parallel plane is approximately equal to $\lambda H/kD$, and the fringe spacing $S_n$ along an axis normal to the reflecting surface is approximately equal to $\lambda H/kD \tan \theta$. For the condition $k \simeq 1$, the spacing $S_p = \lambda H/D$ and $S_n = \lambda H/D \tan \theta$ can be measured with a linear scan array in the respective parallel plane and normal axes. With $\lambda$, D and $\theta$ known, the distance h can be determined. Means for counting detected fringes provides a measure of the extent of relative motion between the receiver and the transmitter or reflecting surface, and means for counting detected fringes for a unit of time yields a measure of the rate of relative motion.

DESCRIPTION OF THE PREFERRED EMBODIMENTS

Figure 1:
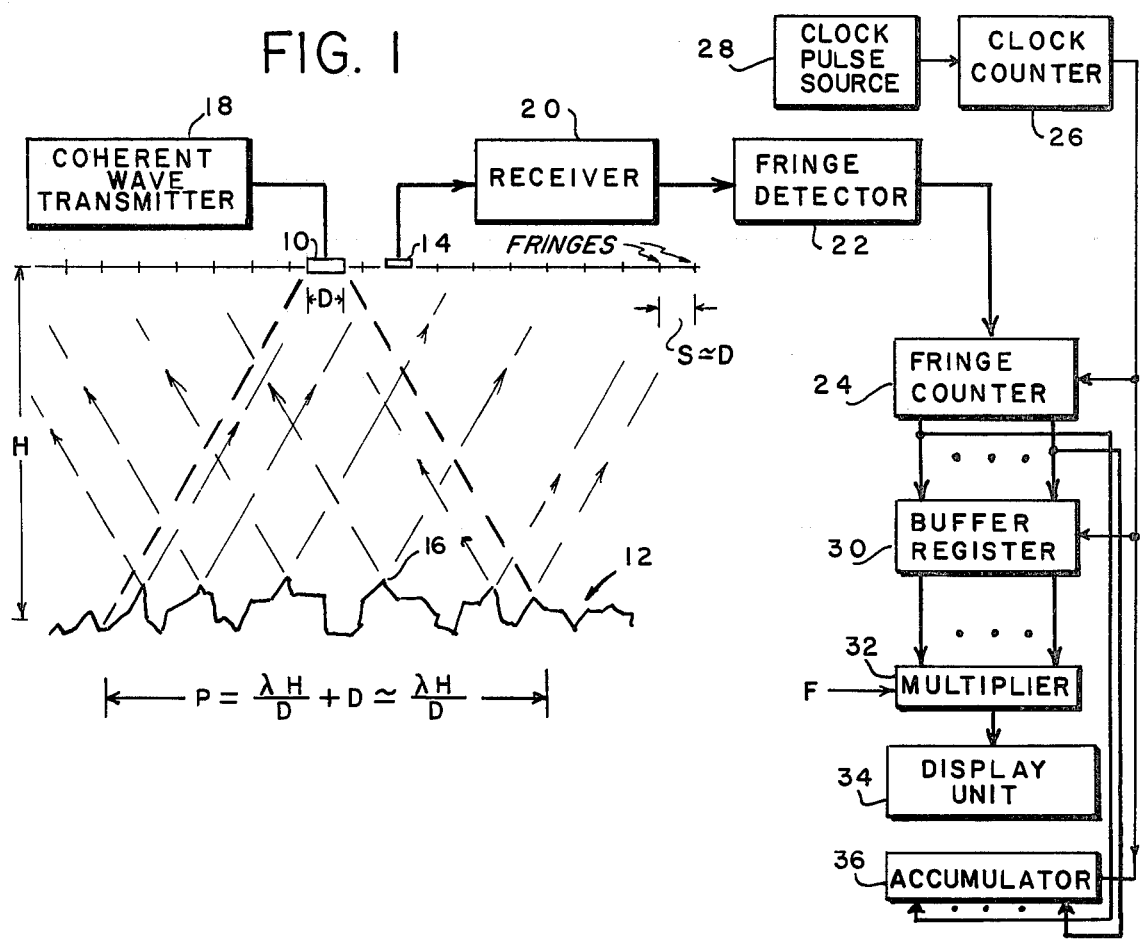
FIG. 1 is a block diagram of an exemplary embodiment of the invention.

The underlying theory of the present invention will first be described with reference to an exemplary embodiment shown in FIG. 1. An aperture 10 is employed to transmit a beam of coherent wave radiation, such as a radar of laser beam, to a rough reflecting surface 12, which may be the ground, ocean or side of a vehicle, for example. The aperture 10 is here shown only for transmitting; an aperture 14 is shown for receiving reflected wave radiation, although in the case of radar it is understood that the same aperture may be used for transmitting and receiving. The maximum dimension of the transmitting aperture is D. The width, P, of the beam on the reflecting surface is found from diffraction theory to be $(\lambda H/D)+D$ where $\lambda$ is wavelength of the system and H is distance from the reflecting surface to the transmitting aperture. For a small D, the width $P \simeq \lambda H/D$. This also assumes the reflecting surface is at a sufficient distance, H, for the farfield region (Fraunhofer region) approximations of the Fresnol-kirchoff scalar diffraction field to be valid, i.e., from $2D^2/\lambda$ to infinity.

It is assumed that the reflecting surface is rough, and that the distance, H, for the transmitting and receiving apertures is substantially the same. If not, a calibration factor k will need to be introduced. Each reflecting point, such as point 16, acts as a scatterer that directs waves back to the aperture 14 just as though it were a coherent transmitter. Consequently, at the transmitter-receiver system comprising a transmitter 18 and receiver 20, there is an interference pattern in the radiation received, and that pattern is fixed in space relative to the scattering points even though the system is moving relative to the reflecting surface, if the extent of motion is less than about half the beam width, P.

The spacing, S, between interference fringes is a function of the greatest distance between two scatterers that contribute to any intensity in the radiation received by the aperture 14. In the usual case of random irregularities in the reflecting surface, this distance is the beam width P on the reflecting surface. More specifically, the finest fringe pattern spacing is given by the equation:

$$S = \lambda H/P \quad (1)$$

Assuming an aperture sufficiently small for P to be approximately equal to $\lambda H/D$, and substituting, equation (1) becomes:

$$S = \lambda H/P \simeq \lambda H/(\lambda H/D) \simeq D \quad (2)$$

It is thus found that the finest fringe spacing, S, is equal to the transmitting aperture, D, which is a known constant. Therefore, to measure relative motion of the transmitter-receiver system relative to the reflecting surface, it is only necessary to detect changes in the polarity of the slope of the receiver output signal, i.e., to detect nulls and/or peaks. Since only the smallest interference fringe patterns are seen (because larger ones are modulated by smaller ones), relative motion through the fringe pattern in a plane parallel to the reflecting surface can be detected by counting the fringes crossed.

Figure 2:
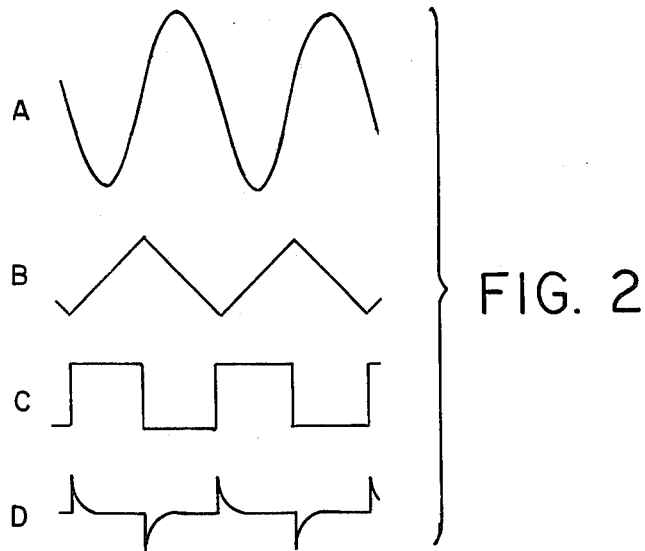
FIG. 2 shows waveforms useful in understanding the present invention.

Detecting the fringes may be accomplished by simply detecting the envelope of the output signal from the receiver, shown as waveform A in FIG. 2, and differentiating it through several stages to obtain signals of the waveforms shown in successive waveforms B, C and optionally D. Although a signal of the waveform A could be operated upon directly for counting fringes, such as by using a saturating amplifier to obtain a square wave signal which is itself suitable for counting (i.e., suitable for triggering a counter on each positive or negative transition), it is preferable to differentiate through two or three stages because the ideal sinusoidal waveform A is to be rarely experienced. In other words, while any known technique for null or peak detection may be employed, simple RC differentiating circuits may be employed (with or without operational amplifiers) to enhance performance in the presence of less well defined nulls and peaks. The additional differentiation stage yields waveform D which provides pulses suitable for counting. Consequently, a fringe detector 22 is employed to couple a fringe counter 24 to the receiver 20.

The fringe counter functions as a meter of fringes crossed, which is to say as a meter of units of space, S, traversed by relative motion between the transmitting-receiving system and the reflecting surface. The motion data thus developed in digital form may be processed in a variety of ways, depending upon the information desired about the relative motion. For example, to develop velocity in the direction of motion, the counter 24 is enabled to count for a predetermined period determined by a clock counter 26 which counts clock pulses from a stable source 28. When the counter 26 overflows, it resets the fringe counter 24 and simultaneously transfers the count attained to a buffer register 30. The count in the register is thus units of space per unit of time. Assuming the counter 26 and clock pulse source 28 are selected to enable the counter 15 for one second, the velocity indicated by the register 30 is $N \times S$ per second, where N is the count in the register and S is equal to D. That velocity may be readily converted to other units, such as knots (nautical miles per hour) by multiplying by a suitable conversion factor F in a multiplier 32.

In the exemplary embodiment illustrated, the multiplier 32 is assumed to be a conventional multiplying analog-to-digital converter which simultaneously converts the digital number in the register 30 to analog form and multiplies by a constant conversion factor set by a potentiometer (not shown). The product is an analog signal that may be displayed on a suitable display unit 34, such as a conventional voltmeter. However, since the null count N is in digital form, digital techniques may be used throughout.

To develop the total extent of relative motion over any length of time, an accumulator 36 may be provided to accept each count transferred to the register 30 and maintain a running total. The accumulator may include a digital clock that accumulates the overflow pulses from the counter 26 and thus keep a running record of elapsed time. For an aircraft, the data thus developed is ground speed and total distance traversed. For a ship, the data developed is speed through the water and distance traversed through the water. Since the water in an ocean will also have motion of its own relative to the earth, it may be desirable to measure the velocity of the water using a transmitter-receiver system mounted on a buoy. A simple mechanical device comprising a vane in the water (pivoted on an axis maintained vertical by a weight suspended on a cable) could be used to determine direction of the water motion. Both direction and speed of the water relative to the earth could thus be telemetered to all ships.

Figure 3:
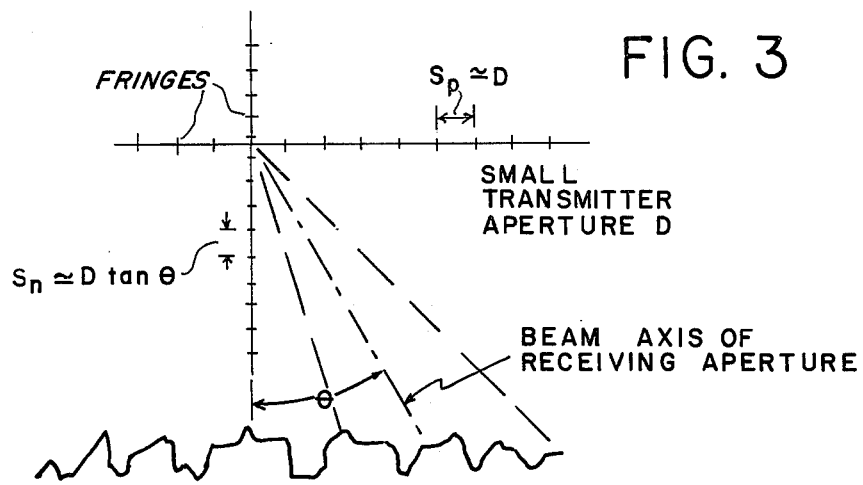
FIG. 3 illustrates diagramatically the present invention for a small transmitting aperture.

The discussion thus far has assumed only motion parallel to the reflecting surface. Under those circumstances there is only one fringe pattern detected, and that is in a plane parallel to the reflecting surface. If the transmitter-receiver system is moving in only a plane normal to the reflecting surface, such as a vertical plane in the example of FIG. 1, there will be a detected fringe pattern in only a plane normal to the reflecting surface. If motion has a vector component in both a plane parallel and a plane normal to the reflecting surface, a fringe pattern will be detected in both planes, and the vector may be computed from the two measured components. Assuming a small aperture, the fringe spacing in the parallel plane, $S_p$, is equal to D as in the case of motion in only that plane. The fringe spacing in the normal plane, $S_n$, is equal to $D/\tan \theta$, where $\theta$ is any angle greater than zero between the axis of the receiving aperture and a reference axis normal to the reflecting surface 12, as shown in FIG. 3. This fringe spacing, $S_n$, is also independent of the distance H of the transmitter-receiver system as long as the transmitting aperture is sufficiently small relative to the distance H for the dimension of the aperture not to be a factor, which is to say for the system not to be diffraction limited.

Assuming a large aperture, one large enough for the dimension of the aperture to be a factor, the fringe spacing in the planes parallel and normal to the reflecting surface are given by:

$$S_p = \lambda H/(\lambda H/D + D) \simeq \lambda H/D \qquad (3)$$

$$S_n = \lambda H/(\lambda H/D + D \tan \theta) \simeq \lambda H/D \tan \theta \qquad (4)$$

Figure 4:
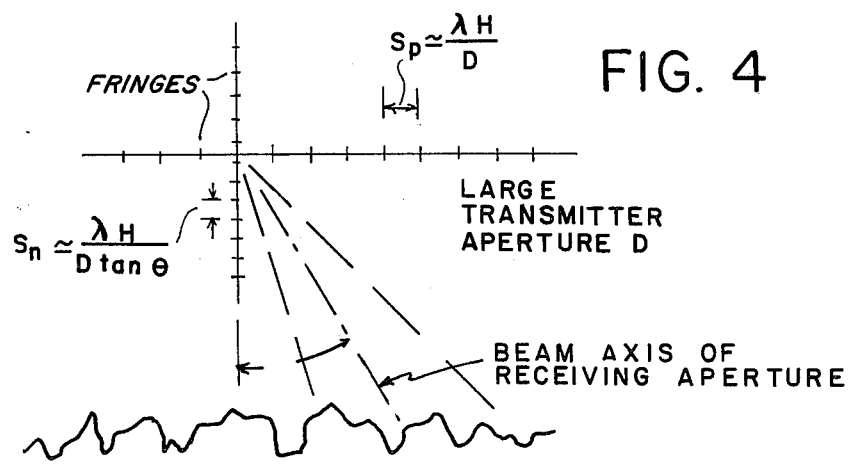
FIG. 4 illustrates diagramatically the present invention for a large (diffraction limited) transmitting aperture.

This diffraction limited system, illustrated in FIG. 4, results in progressively greater fringe spacing on the reference axis normal to the reflecting surface 12, and progressively greater fringe spacing on planes parallel to the reflecting surface as the distance H to the reflecting surface decreases.

This dependence of fringe spacing on H can be exploited, such as in maintaining the distance H constant in some industrial application, or in an aircraft altimeter. To accomplish that, the fringe spacing is measured and multiplied by a constant $K = D/\lambda$ to determine H, as follows:

$$H \simeq S_p D/\lambda = S_p K \qquad (5)$$

$$H \simeq S_n D \tan \theta/\lambda = S_n K \tan \theta \qquad (6)$$

Figure 5:
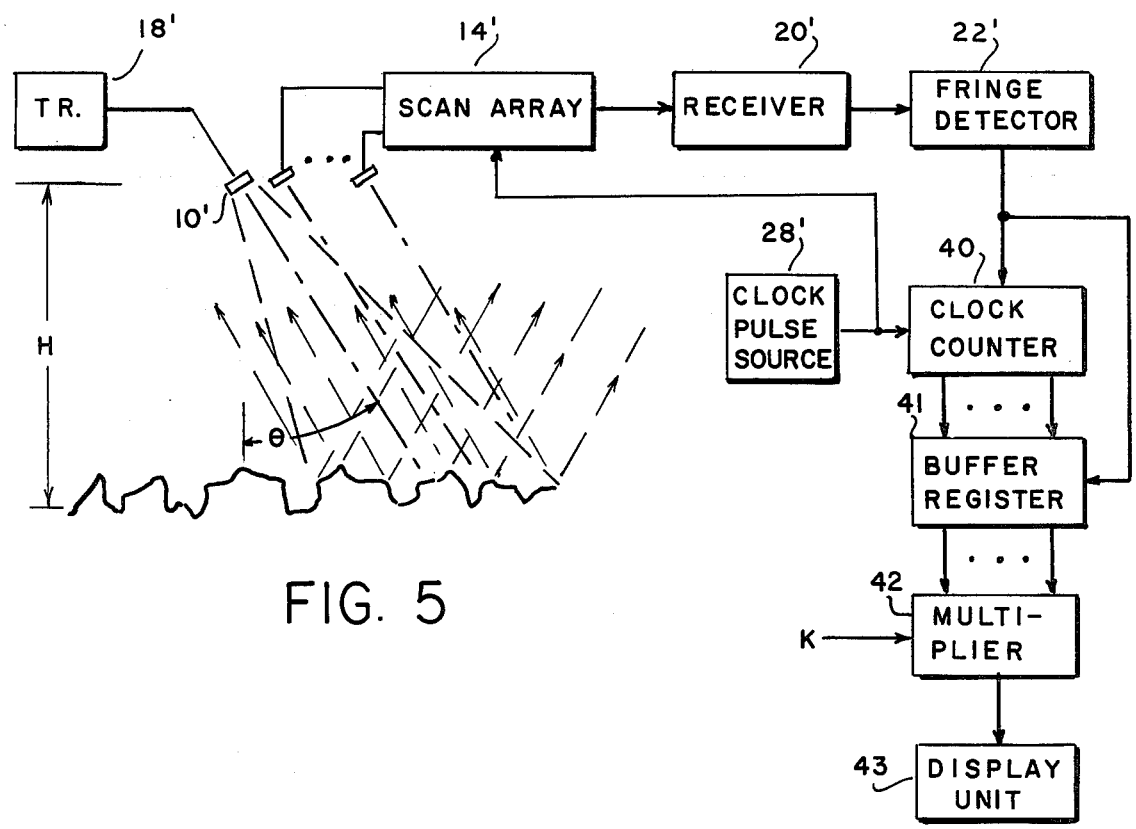
FIG. 5 is a block diagram of a second embodiment of the invention.

FIG. 5 illustrates one method of measuring the fringe size as a modification of the system of FIG. 1. Elements or blocks in FIG. 5 similar in function to blocks in FIG. 1 are identified by the same reference numeral primed, such as the aperture 10' energized by a transmitter 18'. It involves substituting a scan array 14' having a plurality of receiving apertures in place of the one receiving aperture in FIG. 1, and a high speed clock counter 40 for counting clock pulses from a source 28'. Each time a fringe is detected, the counter 40 is reset and its contents are simultaneously transferred to a register 41. The output of the register is multiplied in a calibration multiplier 42 and displayed in a suitable unit 43, such as a calibrated meter. This scan array technique assumes a number of apertures are linearly arrayed in a span less than the expected fringe spacing for the distance H. In an aircraft, the approximate altitude may be determined from a pressure altimeter and a proper wavelength selected to satisfy that requirement. In an industrial application, the range for H will be known and the wavelength selected accordingly.

Figure 6:
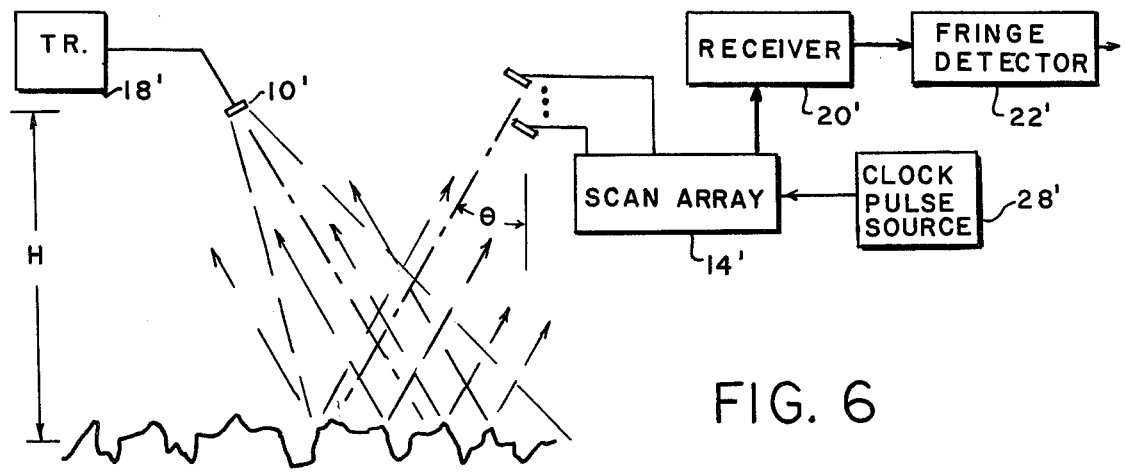
FIG. 6 is a block diagram of a variant of the embodiment of FIG. 5.

For determining the fringe spacing in a plane normal to the reflecting surface, it is a simple matter to turn the scan array 14' to a position in that plane as shown in FIG. 6. If the angle $\theta$ is constant, the system is otherwise as in FIG. 5. If the angle $\theta$ is varied, it can be easily introduced as a variable in the multiplier.

Still other applications will occur to those skilled in the art. Another is to detect relative motion along the axis of the system for maintaining constant the distance H between one object carrying the system and another having a rough reflecting surface using a large aperture such that the minimum spacing will not be equal to D, but will be a function of H. As the distance H varies, diffraction fringes will be crossed and detected. Whether the distance H is opening or closing must, of course, be determined independently, as by a doppler shift of the reflected waves. But once the direction is determined, it is possible to drive a servo to restore the relative distance, and thus maintain the distance constant to within one fringe space. Alternatively, the servo feedback may be applied and its effect detected to reverse its polarity as required, or the servo feedback may be commanded to simply lock in on a fringe by maintaining a null position.

Some applications may involve relatively smooth reflecting surfaces, but if the wavelength selected for the coherent transmitter-receiver system is small enough, even a relatively smooth surface can satisfy the roughness requirement for the sensitivity of the system. Thus, while a radar system may be used for "rough" surfaces, including the surface of the ocean (except when it is very calm), a laser system may be required for relatively "smooth" surfaces. For even greater sensitivity, shorter wavelengths may be used. For example, X-rays may be used for detecting relative molecular motion. For still other applications, such as under the ocean, acoustic wave transmitter-receiver system may be employed.

The discussion thus far assumes that the receiving aperture is at substantially the same distance, H, as the transmitting aperture, as will likely be the case in most applications. If not, a calibration factor, k, may be introduced in the foregoing equations (1) through (6) to account for the difference in distance. The fringe spacing increases as the receiver distance increases so that when that distance is greater than the distance of the transmitter, $k > 1$, and when that distance is smaller, $k < 1$. When the distances are substantially the same $k \simeq 1$, and the equations (1) through (6) are complete.

In the transmitter-receiver systems, either standard AM (amplitude modulation) or FM (frequency modulation) receivers may be employed. In radar systems, a local oscillator is used to provide a reference for phase detection in an FM receiver. In a laser system, the laser beam transmitted may be split, and part redirected through mirrors back for use as a reference in an FM receiver. For AM receivers, the amplitude of the signal envelope is detected. In either case the typical signal from the receiver detector (phase or amplitude detector) is of the form shown in waveform A of FIG. 2. There the constant amplitude and period of a sinusoidal waveform is assumed, but that is not always to be the case; both amplitude and period between nulls will, in practice, vary. The null detection technique suggested will nevertheless be for the idealistic sinusoidal waveform. In any case, all that is required is some means for detecting the fringes; whatever is most practical for the operating environment should be selected.

From the foregoing it is seen that apparatus comprised of standard components may be used to detect and measure relative motion between a receiving aperture and a reflecting surface illuminated with coherent waves from a transmitting aperture. The receiving aperture may be moving and the reflecting surface stationary or vice versa, and in either case the transmitting aperture can be stationary or moving. While selecting the size of the transmitting aperture is important, selecting the size of the receiving aperture is not, although in practice it will be the same aperture in radar systems. However, it is necessary to select a receiving aperture dimension sufficiently small for the sensitivity of the system. The optimum dimension is one equal to approximately one fringe spacing, but it may be equal to two or more fringe spacings provided that fringe detection is sufficiently sensitive to detect when the edge of the aperture crosses a fringe. Obviously the more fringes that are included within the receiving aperture, the more sensitive the fringe detector must be.

Although particular embodiments of the invention have been described and illustrated herein, it is recognized that modifications and variations may readily occur to those skilled in the art. It is therefore intended that the claims be interpreted to cover such modifications and variations.

I claim:

1. In combination, means for transmitting a beam of coherent waves of energy of known wavelength, $\lambda$, from a single source towards a reflecting surface through an aperture of known dimension, D, given by the relationship $P=(\lambda H/D)+D$, where P is the width of the beam on the reflecting surface and H is the distance from the reflecting surface to the aperture, means for receiving coherent waves of energy from said beam reflected by scattering points on said surface at a known distance, H, means for detecting the finest interference fringes between reflected waves of energy from said scattering points by said receiving means, where said fringes have a spacing $S=\lambda H/P$, and means for counting each interference fringe detected as a measure of the extent of relative motion between said surface and said receiving means, said measure being equal to the number of fringes detected times the fringe spacing S.

2. The combination of claim 1 wherein said means for counting said interference fringes detected includes means for determining fringe count per unit of time as a measure of the velocity of said relative motion.

3. The combination of claim 1 wherein said transmitting means is comprised of a transmitting aperture of maximum dimension, D, selected for the width, P, of the beam of waves reaching said surface from said aperture, where said beam reaching said surface is so expanded by diffraction that the dimension, D, of the aperture in the beam width $P=\lambda H/D+D$ may be ignored and the beam width assumed to be $P \simeq \lambda H/D$, whereby the spacing, S, of interference fringes detected in said reflected waves received in a plane parallel to said reflecting surface for relative motion in said plane is approximately equal to the dimension D.

4. The combination of claim 3 wherein said means for receiving waves reflected from said surface has an aperture directed at an angle, $\theta$, between its beam axis and an axis from said receiving aperture normal to said reflecting surface, whereby the spacing, $S_n$, of interference fringes detected for a vector of relative motion along said normal axis is equal to $D/\tan \theta$ while the spacing, $S_p$, of interference fringes detected for a vector of relative motion in said parallel plane is equal to D.

5. The combination of claim 1 wherein said transmitting means is comprised of a large transmitting aperture of maximum dimension, D, selected for the width, $P=\lambda H/D+D$, of the beam of waves reaching said surface from said transmitting aperture, where said beam reaching said surface is so expanded by diffraction that the dimension, D, of the aperture remains a factor in the beam width, P, whereby the spacing, $S_p$, of interference fringes detected in said reflected waves received in a plane parallel to said reflecting surface for relative motion in said parallel plane is approximately equal to the dimension $\lambda H/D$.

6. The combination of claim 5 wherein said means for receiving waves reflected from said surface has an aperture directed at an angle, $\theta$, between its beam axis and an axis from said receiving aperture normal to said reflecting surface, whereby the spacing, $S_n$, of interference fringes detected for a vector of relative motion along said normal axis is approximately equal to $\lambda H/(D \tan \theta)$.

7. The combination of claim 5 including means for measuring the finest fringe spacing, $S_p$, and means for multiplying the fringe spacing thus measured by a constant $K=D/\lambda$ to determine the distance of said parallel plane to said reflecting surface from the equation $H=S_p K$.

8. The combination of claim 1 wherein said transmitting means is comprised of a large transmitting aperture of maximum dimension, D, selected for the width, $P=\lambda H/D+D$, of the beam of waves reaching said surface from said transmitting aperture to be so expanded by diffraction that the dimension of the aperture remains a factor in the beam width, P, and wherein said means for receiving waves reflected from said surface has an aperture directed at an angle, $\theta$, between its beam axis and an axis from said receiving aperture normal to said reflecting surface, said angle being greater than zero, whereby the spacing, $S_n$, of interference fringes detected for a vector of relative motion along said normal axis is equal to $\lambda H/D \tan \theta$, said combination including means for measuring the finest fringe spacing, $S_n$, and means for multiplying the fringe spacing thus measured by a constant $K=D/\lambda$ to determine the distance of said parallel plane to said reflecting surface from the equation $H \simeq S_n K \tan \theta$.

* * * * *